Oct. 2, 1956 P. A. PERILHOU 2,765,462
SIGNALING SYSTEMS
Filed Sept. 9, 1948 6 Sheets-Sheet 1
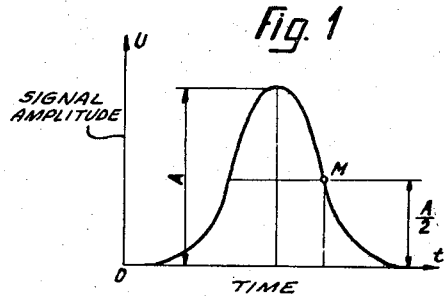
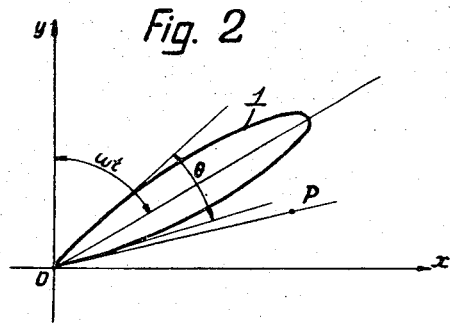
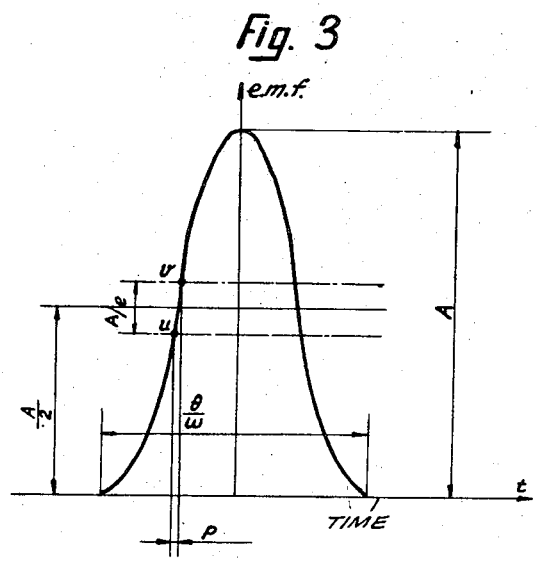
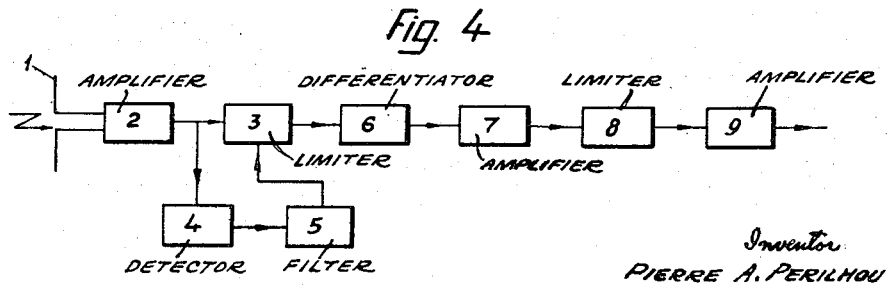
Inventor
PIERRE A. PERILHOU
by Brown + Seward
Attorneys Oct. 2, 1956     P. A. PERILHOU     2,765,462
SIGNALING SYSTEMS
Filed Sept. 9, 1948     6 Sheets-Sheet 2
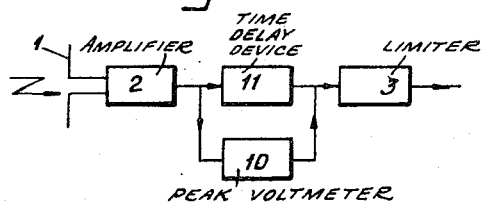
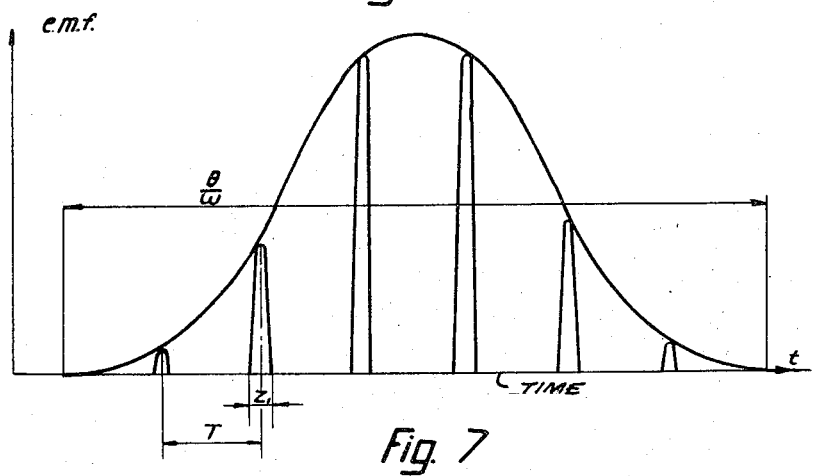
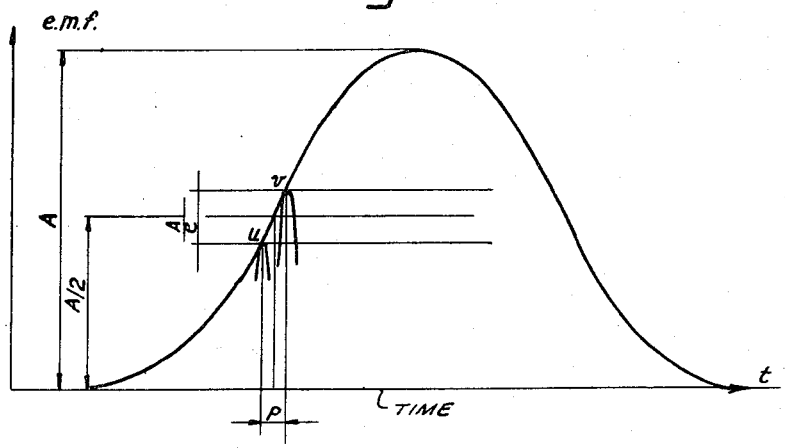

Oct. 2, 1956

P. A. PERILHOU 2,765,462

SIGNALING SYSTEMS

Filed Sept. 9, 1948

Inventor
PIERRE A. PERILHOU by Brown & Deward
Attorneys

Oct. 2, 1956  P. A. PERILHOU  2,765,462
SIGNALING SYSTEMS
Filed Sept. 9, 1948  6 Sheets-Sheet 4
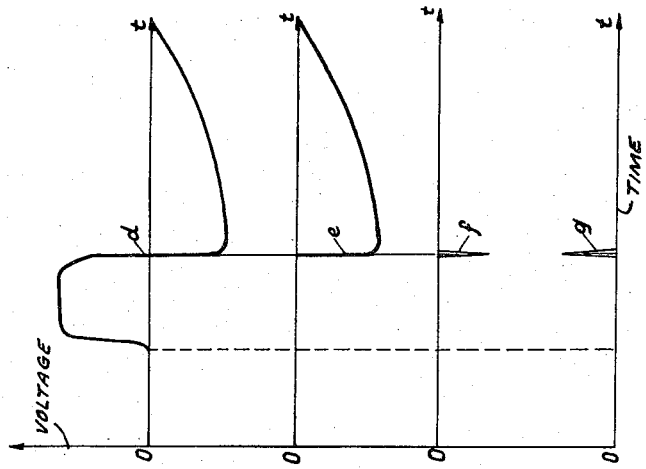
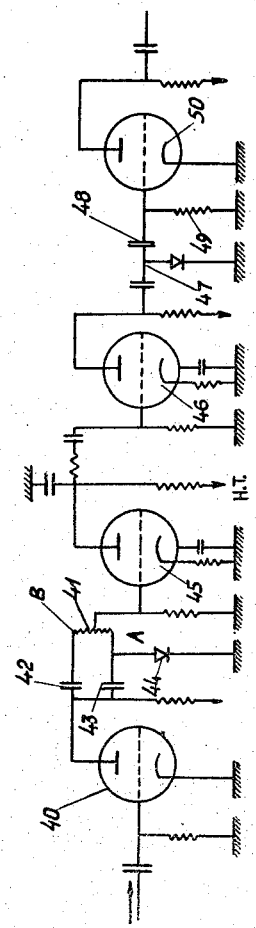
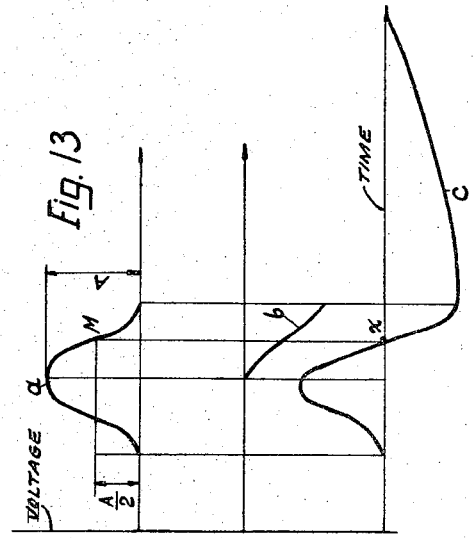
Inventor
PIERRE A. PERILHOU
by Brown & Seward
Attorneys Oct. 2, 1956     P. A. PERILHOU     2,765,462
SIGNALING SYSTEMS
Filed Sept. 9, 1948     6 Sheets-Sheet 5
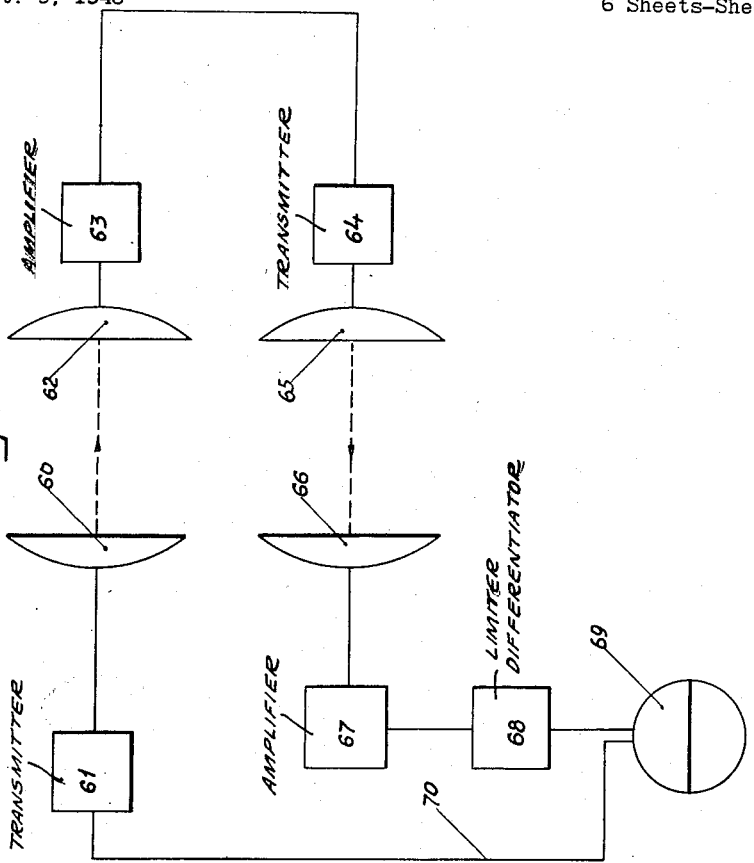
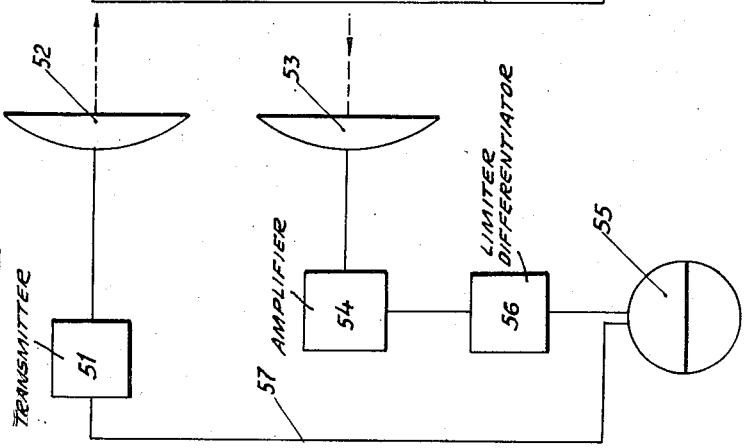
Inventor
PIERRE A. PERILHOU
by Brown + Seward
Attorneys Oct. 2, 1956

P. A. PERILHOU 2,765,462

SIGNALING SYSTEMS

Filed Sept. 9, 1948

Inventor
PIERRE A. PERILHOU by Brown & Seward
attorneys

United States Patent Office 2,765,462
Patented Oct. 2, 1956

2,765,462

SIGNALING SYSTEMS

Pierre Andre Perilhou, Clamart, France, assignor to Office National d'Etudes et de Recherches Aeronautiques, Paris, France, a company of France Application September 9, 1948, Serial No. 48,487

Claims priority, application France September 10, 1947

17 Claims. (Cl. 343—106)

This invention relates to signaling systems and more particularly to such systems in which desired information or intelligence produced, detected or transmitted by electro-magnetic, luminous or acoustical radiations is translated at the receiving station either directly or indirectly by the position in relation to time of signal pulses of electrical energy.

There are known systems of this type in which the working signal pulses have inherently a progressively variable form with a maximum not well defined whereby difficulties are encountered in locating, with a desired precision, the position of such pulses in relation to time.

An example of such system is a system used for determining the azimuth of a given point by means of a rotating beam of radiant energy in which said azimuth is determined by measuring the time interval between the instant of passage of said beam by said given point and the instant of reception of a reference signal indexing the passage of the beam by a known azimuth. In fact, in such a system, the passage of the rotating beam by the given point of reception, induces in a receiving aerial provided at said point, a signal pulse of a progressively variable form, the location of which in relation to time, by indexing the instant of its maximum amplitude, in accordance with the conventional practice, can be effected only with a limited precision in view of an insufficiently acute definition of said maximum.

There are also known signaling systems in which desired information or intelligence is obtained or transmitted by the relative time position of radiant energy pulses transmitted from a sending station and received directly or after reflection, for instance on an object to be detected, in case of a radar installation, by a receiving station. In such systems the time position of respective pulses must be determined with a high degree of precision and therefore use is made generally therein of signal pulses of rectangular or steep wave front form.

The use of such steep wave form pulses involves certain disadvantages and difficulties from the point of view of transmission and reception as well as from the point of view of the width of the band occupied. In fact, the transmission of pulses of rectangular shape requires complicated and expensive apparatus. On the other hand, signal to noise ratio conditions at the receiving end require the use of relatively high transmission levels. Besides, difficulties are encountered in maintaining unchanged the form of such steep wave front pulses in successive stages of receiving apparatus. Finally, the transmisison of such pulses requires a band of relatively great width.

This invention has for its general object to eliminate the above difficulties and drawbacks of known systems of the type referred to above.

Another object of the invention is to provide a novel method and means for locating in relation to time the position of signal pulses of a progressively varying form, i. e. of a non-steep wave front form, whereby either improved operation and higher precision may be obtained in signaling systems in which such pulses are used, or signaling systems normally using said steep wave front form pulses may be made to operate properly with signal pulses of progressively variable or non-steep wave front form.

According to a feature of the invention, there is provided a new method and means for locating in relation to time the position of a signal pulse of a progressively varying form in which said location is determined by indexing in relation to time a predetermined instant of the duration of said pulse outside of its maximum.

According to another feature of the invention, there is provided a new method and means for locating in relation to time the position of a signal pulse of a progressively varying form in which said location is determined by indexing in relation to time a point of its curve of reception corresponding to a certain signal level having a predetermined ratio to the maximum level of the signal, e. g. a point of maximum slope of said curve either on the increasing or decreasing side thereof.

A further feature of the invention consists in the provision of a new method and means for locating in relation to time the position of a signal pulse of a progressively varying form in which said location is determined by indexing a predetermined point of its curve of reception, corresponding to a certain signal level, by producing locally in correspondence with said point a pulse of very short duration the position of which in relation to time defines the position of the received signal pulse.

Another object of the invention is to provide an improved system for determining, with a higher precision than up to the present time, the azimuth of a given point by means of a rotating beam of radiant energy.

Accordingly, another feature of the invention consists in an improved system for determining the azimuth of a given point by means of a rotating beam of radiant energy in which the instant of passage of said beam by said point is determined by locating in relation to time a signal pulse of a progressively variable form induced in a receiving aerial provided at said point, said operation being effected by indexing a predetermined instant of the duration of said pulse outside of its maximum.

A further object of the invention is to provide an improved system of azimuth determination of a given point by means of a rotating beam of a pulsating radiant energy.

According to another feature of the invention, there is provided an improved system of azimuth determination of a given point by means of a rotating beam of a pulsating radiant energy in which the passage of this beam by said point is determined by a point of the envelope curve of successive pulses received at said point during the passage of said beam by said point of reception, said point of the envelope curve being outside of the maximum amplitude of said curve.

According to a still further feature of the invention, there is provided a novel system of azimuth determination of a given point by means of a rotating beam of a pulsating radiant energy in which the instant of passage of said beam by said point is determined by a first pulse, the amplitude of which exceeds a predetermined signal level or else the amplitude of which is below said predetermined level.

According to a further feature of the invention, there is provided a new signaling, transmitting or detecting system of the type specified used for conveying or detecting desired information or intelligence of radiant energy pulses of a progressively variable or non-steep wave front form which are transformed at the receiving station into locally produced, correspondingly timed, steep wave front pulses, the position of which, in relation to time, translates said information or intelligence.

According to a still further feature of the invention, there is provided a signaling or intelligence transmission system of the type specified making use of signals of a progressively variable form the duration of which are substantially greater than the maximum admissible error on their location in relation to time and which do not present steep wave front form, but are characterized by a curve of amplitude variation in relation to time having relatively slowly increasing and decreasing slopes with respect to time difference to be detected therebetween, the location in relation to time of said pulses being determined by indexing a predetermined instant of their duration outside of their maximum.

A still further feature of the invention consists in a signaling system of the type referred to above making use of signal pulses of a relatively long duration and a progressively variable form, in which the position in relation to time of said signal pulses is determined by indexing a point of their reception curve corresponding to a certain signal level having a predetermined ratio to the maximum level of the signal, e. g. the point of maximum slope either on the rising or decreasing side of the signal curve and making a locally produced brief pulse correspond to said point, whereby the position in relation to time of said local pulse serves to define the position in relation to time of the received signal pulse.

A further feature of the invention resides in a remote locating and remote detecting systems of objects or obstacles, the operation of which is based on the measure of time of propagation of progressively variable pulses, as distinguished from commonly used steep rectangular pulses of electro-magnetic luminous or acoustic energy, in which signal pulses thus produced are simply received at the transmitting station after reflection on an obstacle or an object to be detected or in which these pulses are repeated by a responder transmitter and received at the transmitting station.

The invention is also characterized by the provision of an improved system of hyperbolic navigation operating with pulses of the kind referred to above, in which the difference of distance from a point of reception to two transmitting stations operating in synchronism is measured by the time interval between respective pulses received from said stations.

Another feature of the invention resides in the provision of an improved multiplex signaling system in which the normally used signal pulses of rectangular or steep wave front shape are replaced by signals characterised by a progressively variable form in relation to time as referred to above and in which the location in relation to time of said pulses is performed by indexing a point of the reception curve of each signal by making a sharply defined locally produced pulse correspond to said point.

A still further feature of the invention resides in the provision of a signaling system of the type specified in which a limiter arrangement is used in association with receiving means to limit the received signal pulses so as to determine their location in relation to time by a point of the reception curve of such pulses other than the point of the maximum amplitude thereof.

A further feature of the invention resides in the provision of a novel limiter arrangement deriving from a received signal pulse two voltages which are combined to produce a resultant voltage adapted to control the bias of an amplifier tube, so as to cause a sudden change in the signal voltage at a predetermined instant of its duration.

The above and other objects and features of the invention will appear more clearly from the following description and the annexed drawings showing by way of example certain embodiments of the invention.

In the drawings:

Fig. 1 shows a diagram illustrating an example of a signal curve to which this invention is applied.

Fig. 2 gives a schematic view in a plane of a directive beam of radiant energy produced by a rotating radio beacon.

Fig. 3 is a diagram showing a signal reception curve obtained by a point of reception as the result of a passage of the directive beam of radiant energy.

Fig. 4 shows a block diagram of a form of embodiment of a receiving apparatus adapted for use in accordance with the invention.

Fig. 5 shows a block diagram of another form of embodiment of a receiving apparatus which may be used in accordance with the invention.

Fig. 6 is a diagram showing an envelope curve of reception of a pulsed beam of radiant energy when the same passes by a given point of reception.

Fig. 7 is a diagram similar to that of Fig. 6 and which is given for bringing forth more clearly a step of the method according to the invention.

Fig. 12 shows a further embodiment of a limiter arrangement according to the invention.

Figs. 13 and 14 show a diagram serving for the explanation of the operation of the device shown in Fig. 12.

Fig. 15 is a block diagram showing the application of the invention to a reflection radar system.

Fig. 16 is a block diagram illustrating the application of the invention to a responder radar system.

Figure 9:
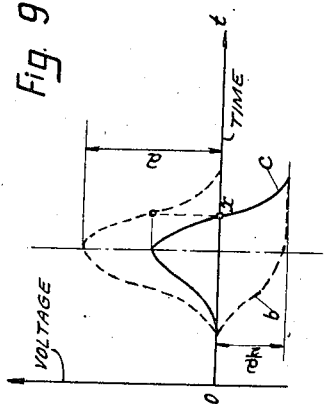
Fig. 9 shows a diagram illustrating the combination of two voltages derived from a received signal and producing a resultant voltage adapted to control the bias of the control grid of an amplifier, in an arrangement according to Fig. 8.

Referring now to Fig. 1 of the drawings, there is shown an example of an amplitude-time curve of a signal to which this invention is applicable. As can be readily understood the location in relation to time of such a signal, if this location is to be determined by the point of the maximum amplitude of said signal, can be effected only with a limited degree of precision in view of the fact that the time curve, such as shown in Fig. 1, does not define this point with a sufficient sharpness.

According to the invention, it is suggested for the purpose of locating such a pulse in relation to time, to use a point of its amplitude-time curve corresponding to a certain signal level, namely, a point corresponding to a level bearing a predetermined relation to the maximum signal level. One obtains then, with respect to the instant defined by the maximum amplitude of said curve, a constant time difference and, therefore, this point can serve for locating said signal with respect to time.

This operation may be performed with the aid of limiter arrangements effecting a sharp limitation of the signal at a predetermined point of its amplitude-time curve, as will be explained with reference to different embodiments of the invention in the following description.

Referring now to Figs. 2 and 3, these figures illustrate an embodiment of the invention in a system of azimuth determination of a given point by means of a rotating beam of radiant energy. Fig. 2 is a plan view, showing an instantaneous position, of a rotating beam 1 of radiant energy of a very high frequency referred to two rectangular axes $x$ and $y$. This beam of radiant energy 1 may be produced by a rotating radio beacon, not shown, placed at point O. The beam is rotating at uniform speed about the vertical axis passing through the point O.

The azimuth of a given point, such as P, is determined by measuring the interval of time elapsing between the instant of passage of the axis of the beam by a known azimuth, generally that of the magnetic north and which may be assumed to correspond in the drawings to the direction of axis Oy, and the instant of passage of the axis of the beam by said given point P.

The passage of the beam by the azimuth corresponding to the magnetic north or, by an azimuth taken as a reference, is indicated by reception at point P of a brief omnidirectional signal transmitted from the beacon at the instant of passage of the beam by said azimuth, whilst the passage of the beam by point P is indicated by a signal induced by the beam in a suitable receiver aerial provided at said point. In view of the fact that the directive beam of radiant energy, such as 1, has a certain width $\theta$ and the curve of reception of a directive aerial has a general form, such as shown in Fig. 3, it is apparent that it is difficult to determine at the receiver end at point P the exact instant corresponding to the maximum amplitude of reception.

In order to eliminate this difficulty it is suggested according to the invention to use, as more suitable and more accurate, a point of the reception curve of said aerial corresponding to the half of the maximum signal level which point corresponds practically to the maximum slope of the signal curve.

One obtains then with respect to the azimuth defined by the maximum amplitude of said curve, a constant angular difference which is dependent on the pattern of the radiating diagram of the aerials and of the signal level adopted to define said point.

This operation may be effected by means of a limiter arrangement associated with the receiver provided at the point of reception P, and which is adapted to prevent the passage of any signal, the level of which exceeds a certain predetermined bias potential, such as a bias potential for which a signal is permitted to pass only if its level attains a half of the maximum amplitude of said signal and which locks the receiver immediately thereafter. In this manner, the position in relation to time of the signal is defined by a point on the rising portion of the reception amplitude-time curve.

The bias potential of the limiter may be constant or variable, but preferably it will be made automatically variable so as to compensate for the variation of distance between the receiver and the radio beacon.

In fact, the intensity of received signals varies with distance and, consequently, the limiting effect cannot take place at a point of the reception curve defined by a predetermined fraction of its maximum level, unless the limiter bias is adjusted proportionally to variation of signals with distance.

Fig. 4 of the drawings shows an embodiment of a receiver apparatus according to the invention. A receiving aerial 1, which may be constituted by a di-pole antenna is followed by an amplifier 2 to which is connected a limiter 3. From the connection between said amplifier 2 and said limiter 3 is derived a branch-circuit including a device known per se, comprising for instance a detector 4 and a filter 5 and which is adapted to produce a D. C. potential substantially equal, or proportional to the top value of incoming signals. This potential collected at the output of filter 5 is applied to limiter 3, so as to bias said latter in such a manner that the same prevents the passage of a signal unless its intensity reaches a predetermined level, for instance, a half-value of its maximum intensity. Said limiter 3 is followed by a differentiating network which makes brief pulses correspond to edged portions of the limited signal curve, which pulses may be then amplified. A second limiter of an ordinary type permits cutting one of such pulse whilst the other after another amplification defines the instant of passage of the beam by the azimuth of the given point of reception.

Thus the azimuth measurement is reduced to the measurement of the time interval between two signals, one defining the passage of the beam through a reference position and another defining the instant of passage of the beam through the azimuth of the given point of reception. This time measurement may be effected in any known manner such as by causing said signals to start and stop respectively a clock mechanism, the movement of said mechanism being then the measure of the azimuth angle, or else by applying said signals to a cathode ray tube, the reference signal controlling the start of the scanning and the beam reception signal energizing the control electrode to appear on the screen, spaced from the origin of the scanning by a distance measuring the angle of azimuth. Clockwork time measurement mechanism is shown in Meissner Patent No. 1,135,604, Apr. 13, 1915, and in Smith Patent No. 2,010,968, Aug. 13, 1935, while cathode ray tube time measurement is conventional, e. g., in radar apparatus.

Fig. 5 of the drawings shows another embodiment of the apparatus which may be used for practicing the method according to the invention. In this embodiment also there is provided a branch-circuit at the output of amplifier 2 connected to a receiving antenna 1. This branch-circuit comprises a device 10 maintaining at its output, for a predetermined time, a D. C. voltage equal to the maximum value of received signal, this voltage acting as the bias voltage for limiter 3. On the other hand, in the direct circuit connection between amplifier 2 and limiter 3 there is provided a device 11 delaying the signal which must pass through the limiter, so that this signal is prevented from passing through the limiter until after this latter is biased by the signal traversing the branch-circuit. This arrangement provides the bias potential for limiter 3 by the signal itself and applies it to said signal.

The biasing and limiter devices will be constituted exclusively by the passive elements such as resistances, condensers, crystal diodes and generally by elements capable of maintaining continuously their precise characteristics and permitting a high degree of accuracy and reliability to be obtained. In fact, the accuracy of the above method of determination of azimuth, or in general of time location of received signals is dependent on the variations which may occur in the limiter. Thus, limiters using vacuum tubes, are subject to variations due to heating and biasing of the tubes as well as to their aging. Consequently, the suggestion of this present invention and the possibility revealed thereby as to the use of limiters composed of elements of constant or permanent characteristics is of importance from the practical standpoint.

The accuracy of the proposed method may be appreciated from the following developments which are to be considered with reference to Fig. 3 of the drawing. When a rotating beam of radiant energy passes by a point such as P at which is located a suitable receiving equipment, the detected electromotive force has an envelope such as represented by the curve of Fig. 2. It will be assumed that there is provided a limiter preventing the passage of signals except when the same attain a level A, equal for instance to a half of the maximum intensity of said signal. As a result of variations in the characteristics of the limiter there exists a zone of indetermination $$\frac{A}{e}$$

such that a signal slightly higher than $$\frac{1}{2}\left(A - \frac{A}{e}\right)$$

may pass sometimes through the limiter whilst a signal slightly lower than $$\frac{1}{2}\left(A + \frac{A}{e}\right)$$

may be prevented from passing at other times. The error in the measurement of the time interval, i. e. in the measurement of a desired azimuth, attains therefore a value $p$. This error may be computed as a function of A and $$\frac{A}{e}$$

The signal reception curve, such as shown in Fig. 3, being symmetrical, it is possible to determine at a first approximation that its slope between points $u$ and $v$ is of the order of $$\frac{4A}{\theta\omega}, \text{whereby } p = \frac{\theta}{4\omega e}$$

This being the case, it results that the accuracy of time measurement is limited to $$\Delta t = T = \frac{\theta}{4\omega e}$$

and the accuracy of angle measurement is limited to $$\Delta\alpha = \frac{\theta}{4\omega e}$$

This shows that the time and angle accuracy are functions of $e$ which must be made as great as possible. This is precisely what is obtained with the use in the limiter of passive impedance elements or elements possessing constant characteristics.

It appears from the description of the above embodiment of the invention that the method according to the same provides an improved system and apparatus for detecting or determining the azimuth of a point with respect to another point by means of a rotating beam of radiant energy located at one point and receiving means comprising a limiter located at another point, this system allowing a greater precision than it was possible to attain up to present time with the known arrangements.

Referring now to Figs. 6 and 7, these figures illustrate another embodiment of the invention applied to the problem of azimuth determination of a given point by means of a rotating beam of radiant energy of ultra high frequency. In this embodiment use is made of a pulsed beam of radiant energy i. e. a beam produced by a succession of pulses of radiant energy whilst its direction is rotated in azimuth at a uniform speed $\omega$.

If one considers a receiver located at a point such as P in Fig. 2, when a pulsed beam during its rotation passes by said point, the electromotive force induced and detected in a receiver placed therein has an envelope curve identical to that obtained with a continuously transmitted beam as in Fig. 2. However, as a result of a pulsed transmission, the curve itself is composed of pulses having said curve for their envelope as shown in Fig. 6. These pulses having a recurrence period T and time width Z, the duration of passage of the beam by a given point of reception is $$\frac{\theta}{\omega}$$

and the number of pulses received during such a passage is $$\frac{\theta}{\omega P} = n$$

These pulses are distributed in the envelope curve in an absolutely unpredictable manner with respect to the origin of said curve. Accordingly, if it is desired to index an instant of said curve by the moment at which a certain pulse is produced for instance the strongest, the time indetermination resulting therefrom attains T and the angular indetermination $\Delta\alpha = \omega t$ attains $\omega T$. This indetermination results from the period of pulse recurrence and not from their duration which, in general is much smaller than T (it being known of course that the ratio of mean power to peak power of a pulse transmitter is equal to the ratio $$\frac{Z}{T}$$

of pulse duration to pulse recurrence period).

In order to define better in relation to time the instant to be indexed (the instant related to a particular position of rotating beam with respect to the receiving antenna) it is possible to reduce T.

$$\Delta t = T$$

In order to define better this position angularly, it is possible either to reduce T or to reduce $\Delta\alpha = \omega T$.

The following considerations will permit determination of the limit beyond which there will be practically no advantage to reduce T for improving the time and angular definition of the passage of the beam by a point of reception. As it is very difficult to determine with accuracy the position of the maximum of a curve, it is suggested in accordance with this invention to determine the desired instant of the envelope curve, for instance, by the first pulse the amplitude of which exceeds a predetermined level, for instance, the half value of the strongest pulse received according to indications given in Fig. 6.

Furthermore, after the reception of a first pulse capable of passing through the receiver, this latter will be locked during a time interval sufficiently smaller than $$\frac{1}{\omega}$$

One will receive therefore but a very short pulse of duration Z. This discrimination will be effected for instance by a suitable limiter adapted to prevent the passage of a signal except when the same has an amplitude exceeding $$\frac{A}{2}$$

and a suitable blocking device. However, this limiter must be necessarily controlled by the bias voltage as its characteristics are subject to variations. There exists therefore a region of indetermination $$\frac{A}{e}$$

such that a signal slightly higher than $$\frac{1}{2}\left(A - \frac{A}{e}\right)$$

may pass sometimes whilst a signal slightly lower than $$\frac{1}{2}\left(A + \frac{A}{e}\right)$$

may be prevented from passing some other time, $e$ defining the accuracy of the limiter. The indetermination in relation to time of the position of the received signal, may attain therefore a value $p$. The result is that there is no advantage in choosing T lower than $p$.

It is possible to compute $p$ as a function of A and $$\frac{A}{e}$$

The envelope curve of Fig. 6 being a symmetrical one, it is possible to determine with a first approximation that its slope between points $u$ and $v$ is of the order of $$\frac{4A}{\theta/\omega}$$

Hence:

$$p = \frac{\theta}{4\omega e} \text{ and } T. \ m. = \frac{\theta}{4\omega e}$$

Accordingly, the accuracy in time is limited to $$\Delta t = T = \frac{\theta}{4\omega e}$$

For increasing the limit of time resolution, one can reduce $\theta$ or increase $\omega$ or $e$. The angular accuracy is limited to $$\Delta\alpha = \frac{\theta}{4e}$$

In order to increase the limit of angular resolution, it is sufficient to reduce $\theta$ or to increase $e$.

Finally, if it is desired to obtain N indications per second, there is obtained a sweep angle given by the relation $$\alpha + \frac{\omega}{N}$$

The same method may be reduced to practice by using the first pulse which would be lower in its amplitude than a predeterminate level on the decreasing portion of the envelope curve. In such a case, use will be made of a limiter adapted to prevent the passage of signals unless the same are lower than a predeterminate level and blocking the receiver immediately thereafter. As in case of a previously discussed embodiment, the bias of the limiter may be either adjustable or fixed. It is however advantageous to use an adjustable bias or still better an automatically variable bias taking into account the variation of distance between the point of reception and the radio beacon. In fact, the intensity of signals varies with the distance of the point of reception to the radio beacon and consequently the limiting effect cannot take place at a desired point of the envelope curve of signal reception defined by a predetermined fraction of the maximum signal level, unless the bias of the limiter is adjusted with reference to the variation of signals with distance.

If one refers now to Figs. 8 and 14, there are shown certain preferred embodiments of limiter and limiter-differentiator arrangements suitable for locating in relation to time signal pulses of non-steep wave front form, which may be used in place of limiter arrangements previously described with reference to Figs. 4 and 5, in systems of azimuth determination or other signaling systems making use of signals of the above mentioned type.

These arrangements are based on the derivation from a received signal of two voltages which are combined to produce a resultant voltage which is adapted to control the bias of an amplifier tube so as to determine a sudden change in the signal voltage at a desired instant of its duration. More particularly, one of said derived voltages reproduces the form of the received signal whilst the other is so timed and shaped in relation to said signal voltage that the resultant voltage controlling the bias of an amplifier causes a sudden change in the signal voltage at the desired instant of signal duration.

In the first of said arrangements which will be described now with reference to Figs. 8 and 9, the second voltage has its phase reversed with respect to that of the first voltage and its amplitude limited for instance to a half value of the first voltage, said amplitude remaining constant from the instant at which said first voltage passes through its maximum. There is obtained a resultant voltage which intersects the axis of zero potentials at the instant corresponding to the half value of the maximum signal amplitude on the descending side of the amplitude-time curve of said signal.

Figure 8:
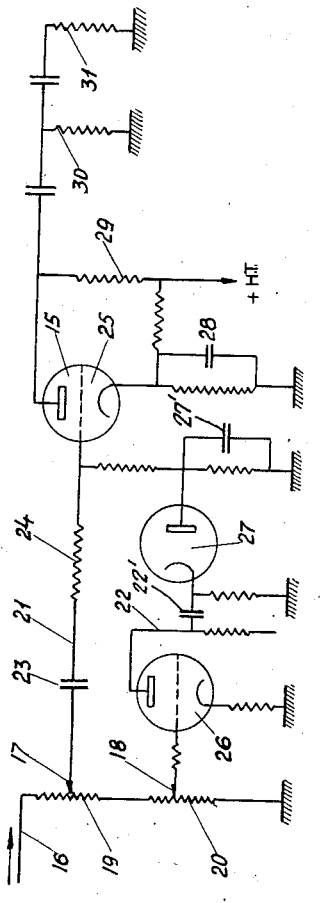
Fig. 8 shows another embodiment of a limiter apparatus according to the invention.

As shown in Figs. 8 and 9, the two voltages are combined to produce a resultant voltage providing a bias potential for the control-grid of an amplifier tube 15 which in the absence of signals is biased to cut-off. Said two voltages are derived from a signal receiving circuit 16 by means of taps 17 and 18 on two potentiometers 19 and 20 inserted in series in said signal circuit, said taps pertaining respectively to two branch circuits 21 and 22. Branch circuit 21 for the first said voltages, namely that reproducing the form of received signals, comprises a connection from tap 17 to a condenser 23 and a resistor 24 to grid 25 of amplifier tube 15.

The second voltage is supplied by branch circuit 22 comprising between tap 18 and grid 25 a network including a triode tube amplifier 26 and a diode 27, this network being effective to reverse the polarity of said second voltage and to limit the same to a constant value from the instant at which the first voltage passes by its maximum, in order to define the desired instant of signal duration by means of a predetermined point of the received signal time-amplitude curve. This action results from the cooperation of the circuit of diode 27 and condenser 22'. During the rising portion of the signal pulse condenser 22' drives the cathode of diode 27 sufficiently negative to permit this tube to conduct and cause a progressively increasing negative voltage to be applied to the grid 25. During the decreasing portion of the signal pulse condenser 27', charged during said first phase of operation, contributes to the maintenance of said negative voltage. Thus, in the example shown, the second voltage is limited to a half-value of the maximum signal voltage. The cut-off bias of amplifier tube 15 is produced by a resistance bridge 28—29 the common point of which is connected to plate HT source, as shown in Fig. 8.

The plate circuit output of tube 15 feeds two differentiating bridges 30 and 31, each comprising a resistance-capacity combination.

The operating principle of this arrangement will appear clearly from the consideration of Fig. 9 showing a diagram illustrating the composition of the resultant voltage applied to the control-grid of amplifier tube 15. The signal voltage transmitted by branch-circuit 21 connecting the control grid 25 to potentiometric tap 19, is indicated therein at $a$; curve $b$ represents the voltage derived from the potentiometric tap 20 and the polarity of which is reversed with respect to that of the first voltage whilst its amplitude is substantially limited to a half-value of said first voltage, from the instant of passage of said latter mentioned voltage through its maximum. The superimposition of these two voltages gives a resultant voltage $c$ which, as indicated on Fig. 9, intersects axis $ot$ which represents the cut-off bias of the tube, at a point $x$ corresponding to a predetermined signal level. In the example shown, point $x$ corresponds to the half-value of the maximum signal amplitude and defines the time position of said signal by the corresponding point of the descending side of the time-amplitude curve $a$. The passage of the grid-voltage of tube 15 by the cut-off value of the same is obtained thus at a well determined instant of the signal curve. This instant may be easily adjusted to be that at which the signal has a desired value that corresponds to the half-value of its maximum amplitude.

Figure 11:
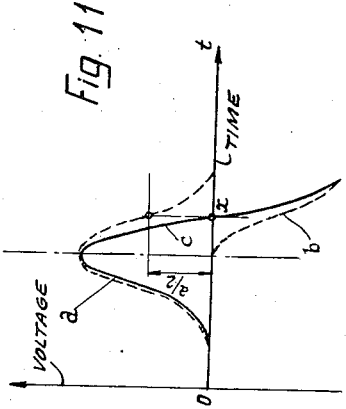
Fig. 11 shows a diagram illustrating the combination of two voltages obtained in the arrangement according to Fig. 10.
Figure 10:
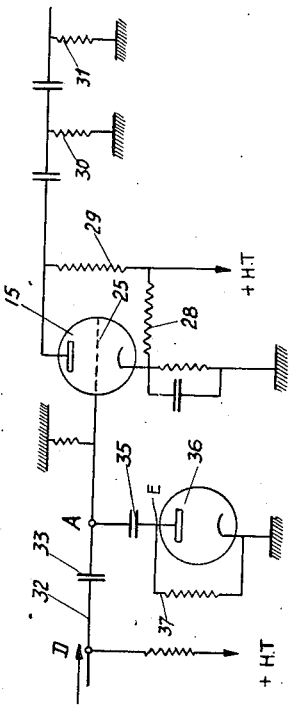
Fig. 10 shows another embodiment of the limiter arrangement according to the invention.

Fig. 10 of the drawings shows another embodiment of the limiter arrangement according to the invention. In this embodiment again there is used an amplifier tube 15 biased to cut-off, in the absence of a signal, by a resistance bridge 28—29 similar to that shown in Fig. 8. The bias of the control grid 25 of said tube, upon reception of a signal, is controlled again by a voltage $c$ resulting from the combination of two voltages $a$ and $b$ as shown in Fig. 11. In this arrangement, signal voltage $a$ is supplied by a connection 32 through a condenser 33 whilst voltage $b$ of opposite phase is produced by a network comprising a condenser 35 in series with a diode rectifier 36 shunted by a resistance 37 and connected in the grid circuit of amplifier tube 15.

The relative values of two condensers 33 and 35 and of resistance 37 are so chosen that during transient conditions, said capacities behave themselves as low impedances. When the potential of point D increases, the impedance of diode 17 is practically negligible and impedance 33 and 35 are in series. The potential of point A rises.

When the potential at point D decreases, the strong impedance due to resistance 37 makes its appearance.

There are present two low impedances 33 and 35 in series with a high impedance; the potential of point D is transmitted to point E, the potential of which decreases with respect to its value at the beginning of said reduction and which was equal to zero. The potential of point E becomes thus negative and that at point A which was originally positive becomes negative.

The resultant voltage of the control grid 25 of tube 15 on Fig. 10 varies thus during a signal pulse following curve $c$ of Fig. 11 which intersects axis $t$ corresponding to the cut-off bias of said tube at a well-determined instant of signal curve $a$. The plate current of tube 15 is then differentiated by two differentiating networks which may comprise capacity and resistance combinations 30 and 31.

In the above described two arrangements, diode rectifier 27 of Fig. 8 and diode rectifier 36 of Fig. 10 may be replaced by detectors of any type, for instance, crystal detectors or a dry rectifier.

Referring now to Figs. 12 to 14, they relate to a still further embodiment of an arrangement permitting a sudden change in a received signal voltage to be obtained in order to define a desired point of its duration or a point of its time-amplitude curve.

In this embodiment, use is made of an amplifier tube 40 receiving signal pulses and feeding an impedance network deriving from corresponding signal pulses transmitted by tube 40, a first voltage $a$ reproducing the receiving signal pulse and a second or auxiliary voltage $b$ of opposite polarity as in the case of Fig. 10, said latter voltage being superposed on said signal voltage $a$. This arrangement comprises a mixer network 41 having with the output of tube 40 two branch connections: one, providing a direct connection by a condenser 42 and a second providing an indirect connection comprising a condenser 43 and a rectifier 44. Mixer 41 feeds two amplifier tubes 45 and 46 followed by a limiter-detector arrangement 47, then, by a differentiator comprising a capacity-resistance combination 49—49 and finally by a limiter-amplifier 50.

Referring now to Fig. 13 of the drawings, there is shown a signal potential curve $a$ as it is transmitted by the direct connection from the output of tube 40 to a mixer 41 as well as the auxiliary potential $b$ introduced by the second connection between said two elements. Finally, there is indicated by curve $c$ the resultant voltage obtained by the superposition in the mixer of said first two voltages.

The operation of this arrangement will be readily understood if it is noted that during a transitory period a condenser is practically equivalent to a short-circuit, for the variable portion of the voltage curve. When the plate voltage of tube 40 rises, the low resistance of condenser 43 is itself grounded and point A is grounded. During this time a fraction of the signal flows through mixer 41. When the plate voltage decreases, the short-circuit of rectifier 44 is suppressed and the potential of point A decreases with respect to its value at the instant at which the voltage was maximum, that is with respect to the maximum signal voltage. The potential of point A becomes thus negative. On the other hand, the voltage at point B tends towards its maximum value.

The output voltage of mixer 41 after a double amplification by tubes 45 and 46 takes a form such as represented by curve $d$ on Fig. 14. This voltage after detection gives a signal of the form indicated by curve $e$ on the same Fig. 14, which voltage is transformed by differentiating arrangement 48—49 into an extremely sharp pulse as indicated at $f$ on Fig. 14. Finally, this signal upon being amplified by tube 50 changes its polarity and becomes the final signal used for indication.

If tube 40 works in the straight line part of its characteristic, point $x$ on Fig. 13 is perfectly fixed. The successive amplifications followed by the limitation produce a signal having a very steep wave front form which, by differentiation, gives place to extremely narrow and sharply defined pulses adapted to be easily exploited.

Thus the time position of a signal pulse having a non-steep wave front form may be determined by indexing an instant of its duration corresponding to a predetermined signal level by a locally produced sharply defined pulse, the position of which in relation to time produces the position in relation to time of the received signal.

Although the above arrangements have been described mainly in application to an improved method of azimuth determination of a given point of reception by means of a rotating beam of ultra-high frequency radiating energy, these arrangements may serve to produce improved signaling systems in which up to the present time, pulses of steep wave front form have been exclusively used. Accordingly this invention contemplates further the modification of such signaling system whereby use may be made therein of signal pulses of a progressively varying form or in general of a non-steep wave front form which provides the advantage of eliminating various drawbacks inherent in the transmission and reception of such steep wave front form pulses.

Figures 15 to 18 illustrate the application of this principle to some preferred systems of this kind although it will be understood that this principle may be applied to any other system in which the desired information or intelligence is produced, obtained or transmitted by the position in relation to time of signal pulses.

Referring now to Fig. 15, this figure shows the embodiment of the invention in a radar system of the reflection type, which embodiment is characterized by the use of a limiter-differentiator arrangement of the type previously described between the receiving elements and indicating means of a receiver station of such a system.

As it is shown in said figure, such a radar system may comprise a transmitter 51 feeding a transmitting aerial 52 projecting, following its radiation, axis signal pulses of a general form such as shown in Fig. 1. These signal pulses after reflection on an object to be detected return on a receiving aerial 53 of the system followed by an amplifier 54, the output of which is connected to an oscilloscope 55 by means of a limiter-differentiator arrangement 56 of the type described hereinabove and which effects the separation of received signals following two ways of transmission, with a reversal of polarity in one of said ways, addition of signals of said two ways, amplification, limitation and finally differentiation of the resultant signal so that at the output of said arrangement, there appears a locally produced sharply defined pulse which defines the precise instant of the arrival of the reflected signal pulse on the receiving aerial of the equipment. The oscilloscope 55 fed by this arrangement has, on the other hand, as usual, a connection 57 with transmitter 51.

Fig. 16 shows the embodiment of the invention in a responder radar system. On said figure a directive aerial 60 under the action of transmitter 61 radiates signal pulses of a general form corresponding to Fig. 1. These signal pulses are received by a receiving aerial 62 of the responder station, which aerial is followed by an amplifier 63 and a transmitter 64 of the type capable of reproducing its control signal, that is a signal of the form such as produced by the first transmitter 61. The responder transmitter 64 feeds a transmitting aerial 65 of the responder station which radiates toward the receiving aerial 66 of the interrogator station an amplified signal of the same form as the signal transmitted originally. In order to determine with precision the instant of arrival of said signal at the interrogator station, the receiver-amplifier 67 of the latter is connected as previously described to a limiter-differentiator arrangement indicated at 68, which latter feeds then the indicator such as an oscilloscope 69. In this case, also said oscilloscope 69 has a connection with transmitter 61.

A similar system may be constructed with the aid of a responder transmitter of a triggered type in which case a limiter-differentiator arrangement identical to that provided in the receiver of the interrogator station is inserted between such a triggered transmitter 64 and the receiver-amplifier 63 of the responder station. This arrangement indicated in dotted lines on Fig. 16 introduces a triggering pulse for said responder transmitter. This latter transmits then towards the interrogator station a pulse of desired form, the position of which in relation to time is determined at the receiver 67 of the interrogator station by the same method as previously described.

Figure 17:
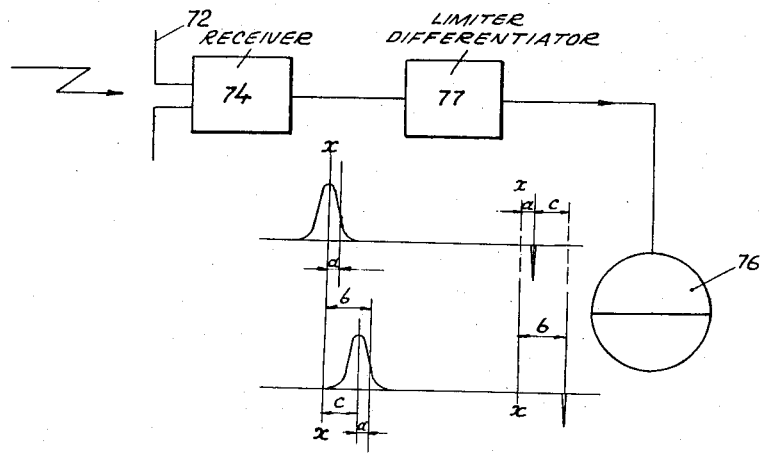
Fig. 17 is a diagram illustrating an embodiment of the invention in a receiver device of a hyperbolic navigation system and Fig. 18 is a block diagram showing an embodiment of the invention in a multiplex transmission system.

The invention contemplates also the application of the method of locating in relation to time of pulses of a progressively variable form or, in general, of a non-steep wave front, to a system of hyperbolic navigation so as to render possible the use, in such a system, of transmitters working with pulses of the above specified form which permits elimination of the difficulties inherent in the transmission and reception of steep wave front form pulses. As shown in Fig. 17 relating to a receiver intended for use in such a system on a mobile craft, the same comprises a receiving aerial 72 followed by a receiver 74 comprising an amplifier connected to an indicating device such as oscilloscope 76 by means of a limiter-differentiating arrangement 77 of the type specified above which, being fed by the amplified pulses of a general form such as indicated in Fig. 1, produces at its output sharply defined pulses defining the instant of reception of incoming signals produced by two transmitters of each base of the system, these signals being then utilised for producing the desired indication of position or orientation of a craft carrying such a receiver equipment.

The invention contemplates further the application of the method of locating in relation to time of pulses of a progressively variable form to a multiplex transmission system making use of position modulated pulses. In fact, in all known systems of such a type, use is generally made of sharply defined rectangular pulses which lend themselves easily to a precise location in relation to time but introduce many drawbacks as has been previously explained. Now, in accordance with the invention such systems may be made to operate properly with pulse having a progressively variable form which permits elimination of said difficulties inherent in the use of rectangular or sharply defined pulses.

Figure 18:
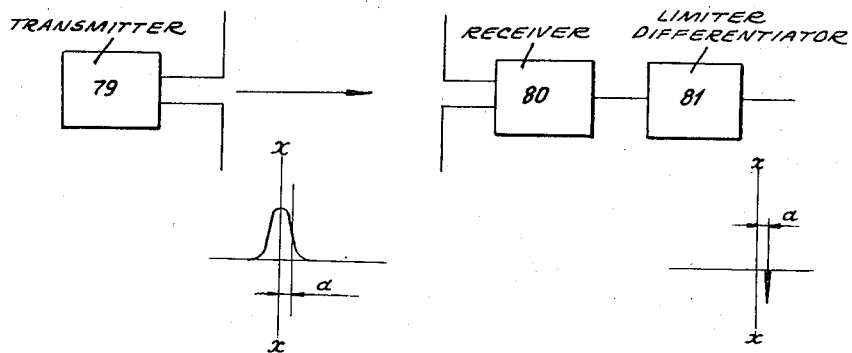

Fig. 18 of the drawings gives a schematic illustration of the embodiment of the invention in such a system. On said figure, a transmitter of a multiplex system is indicated at 79 and the receiving equipment is indicated as comprising a receiver amplifier 80 which is followed by a limiter-differentiator arrangement 81 producing at its output, as previously described, sharply defined pulses locally produced corresponding with relation to time, to the incoming signals of the progressively variable form transmitted by the transmitter.

The method according to the invention is applicable as well to the problem of locating with relation to time of pulses constituted by the variations not only of amplitude but also of frequency, phase or any other characteristic of a carrier wave. In such a case, the received modulated signal will be first fed to a discriminator which will transform the variable characteristic of a received signal into an electrical potential, the amplitude of which will vary with time in proportion to the variation of said characteristic and the signal potential thus produced will be located then with relation to time by applying to said potential the method according to the invention.

The signal pulses may be produced by luminous, acoustical or other kinds of wave energy and the location with relation to time of such pulses will be obtained by transforming said pulses into variations of an electrical potential reproducing with relation to time the form of such pulses and the location with relation to time of said signals will be then obtained by applying to said potential the method according to the invention.

In particular, the method of azimuth determination of a point may be reduced to practice with such radiations as follows:

The rotating beacon will be adapted to produce luminous or infra-red radiations which may form a directive beam similar to that produced with electro-magnetic radiations. At the receiving end use will be made of receiving means similar to those previously described, except for the aerial which will be replaced by a photo-electric cell or a known receiver of infra-red radiations. It is to the output voltage of such a cell or receiver that the specified method of signal limitation will be applied.

In this respect, it may appear upon a first consideration, that the time constant of photo-electric cells or infra-red radiations receivers which in general is not small and causes a deformation of received signals, may prohibit the use of such radiations for a reduction to practice of the specified method of azimuth determination of a receiving point. However, upon a further consideration, it will be understood that this fact does not constitute actually an obstacle to the use of such radiations provided the incoming signals always present the same variation with respect to time. This condition is practically fullfilled in said application of the specified method of azimuth determination due to the fact that successive signals are derived from the same source and are produced by a beam rotating at a constant speed that the response of a cell of an infra-red receiver has a general form which is independent of the receiving signal level.

In fact, if one compares the illumination curves and the response or output voltage curves of a photo electric cell at two different distances from a corresponding beacon, it appears that by applying the method of signal limitation according to the invention to the output voltage of a cell, or an infra-red receiver, one obtains for both distances the same definition of azimuth.

The same considerations apply to any other signaling system in which signal pulses are transmitted or produced by luminous, acoustical or infra-red radiations and in which the desired intelligence is conveyed by relative time positioning of said pulses.

Although several embodiments of the invention have been described and illustrated, certain of same in details, it is to be understood that the invention is not limited thereto and that various modifications may be made therein without departing from the scope of the present invention which is defined by the following claims.

Having now particularly described and ascertained the nature of my said invention and in what manner the same is to be performed, I declare what I claim is:

1. The method of locating in relation to time variable level radiant energy signal pulses of a non-steep front form induced in a receiving apparatus, which consists in deriving from each of said signal pulses a control voltage, producing, under the control of said voltages, short duration pulses defining, for any value of the maximum level of said signal pulses, a point of the amplitude-time curve of each signal pulse, time-spaced by a constant interval from the point of its maximum amplitude and corresponding to a signal level having a predetermined constant ratio to said maximum signal amplitude, and measuring the position of said short duration pulse on a time scale.

2. The method of locating in relation to time variable level radiant energy signal pulses of a non-steep front form induced in a receiving apparatus, which consists in deriving from each of said signal pulses a control voltage, limiting each signal pulse under the control of said voltages at a point of its amplitude-time curve time-spaced by a constant interval from the point of its maximum amplitude and corresponding to a signal level having a predetermined ratio to said maximum signal amplitude, producing locally by differentiation in correspondence with said point an indexing pulse of a very short duration and a steep front form, and measuring the position of said short duration pulse with reference to a time scale.

3. In a signaling system, means for receiving radiant energy pulses of a non-steep front form and variable level, means for locating in relation to time said received pulses, said latter means comprising means for deriving from each of said received pulses a control voltage, means for limiting each received signal pulse, under the control of said voltages at a point of its amplitude-time curve time-spaced by a constant interval from the point of its maximum amplitude and corresponding to a signal level bearing a predetermined ratio to said maximum amplitude, means for producing locally in correspondence with said point, by differentiating the so limited signal pulse, a steep front short duration pulse registering with respect to time the position of said received signal pulse, and means for utilizing said short duration pulses.

4. A signaling system according to claim 3 in which the means for locating in relation to time the received signal pulses comprise, in combination, means for deriving from each of said received pulses a voltage of a different amplitude and opposite polarity, means for combining said voltage with the received signal pulse to produce a resultant limited voltage presenting a sharp change of polarity at a predetermined instant of signal duration corresponding to a signal level having a predetermined ratio to said maximum amplitude, and means for differentiating said resultant limited voltage to produce in correspondence with said point a steep front short duration pulse registering with respect to time the position of said received signal pulse.

5. A signaling system according to claim 3 in which the means for locating in relation to time the received signal pulses comprise, in combination, means for deriving from each said signal pulse two voltages one of which reproduces the form of said signal pulse while the other has its polarity reversed with respect to that of the first voltage and its amplitude limited to a value having a predetermined and constant ratio to said maximum amplitude of the first voltage, said limited amplitude remaining constant from the instant at which said first voltage passes through its maximum, means for combining said two voltages to produce a resultant voltage which passes through a zero value at the instant corresponding to the passage of the amplitude-time curve of said first voltage, on its descending side, through a value equal to said limited amplitude of said second voltage, an amplifier tube, means for applying said resultant voltage to control the bias of said amplifier tube so as to cause the plate current of said tube to pass through its cut-off value at said predetermined instant, and means for differentiating the output of said amplifier tube for producing at said instant a steep front short duration pulse adapted to define the time position of said signal pulse.

6. A signaling system according to claim 5 in which the amplifier tube is normally biased to cut-off.

7. A signaling system according to claim 5 in which the second voltage is derived from a circuit comprising a non-linear element.

8. In a signaling system, means for receiving radiant energy pulses of a non-steep front form and variable level, means for locating in relation to time said received pulses, said locating means comprising in combination means for deriving from each of said received pulses two voltages of different phase and of opposite polarity, means for combining said voltages to produce a resultant voltage presenting a sharp change of polarity at a predetermined instant of signal duration time-spaced by a constant interval from the point of its maximum amplitude and corresponding to a signal level having a predetermined ratio with respect to said maximum amplitude, means for differentiating said resultant voltage to produce a sharply defined short duration pulse in correspondence with said point of change in polarity of said resultant voltage, and means for using said latter pulse for registering in relation to time the position of said received pulse.

9. In a signaling system, means for receiving radiant energy pulses of a non-steep front form and variable level, means for locating in relation to time said received signal pulses, said locating means comprising in combination means for deriving from each said signal pulse two voltages one of which reproduces the form of said signal pulse and the second of which has its phase and polarity changed with respect to said signal pulse so that the combination of said two voltages produces a resultant voltage passing with a steep slope through its zero value at a predetermined instant of signal duration corresponding to a signal level having a predetermined ratio with respect to the maximum amplitude of said signal pulse, means for combining said two voltages, an amplifier tube, means for applying said resultant voltage to control the bias of said amplifier tube so as to cause the output of said amplifier tube to pass through its cut-off value at said predetermined instant, and means for differentiating the output for producing a steep front short duration pulse adapted to define the time position of said signal pulse.

10. A signaling system according to claim 9 in which the second voltage derived from the received signal pulse has its polarity reversed and its phase delayed with respect to said first voltage so that it starts to build up from the instant that the first voltage has passed through its maximum value, said second voltage being equal at any moment to said maximum value of said first voltage reduced by the instantaneous value of said first voltage.

11. A signal system according to claim 9 in which the amplifier is normally biased to a value different from that of cut-off and is followed by a limiter and then a differentiator to first limit the output of said amplifier and then differentiate it.

12. A signaling system according to claim 9 in which the second voltage is derived from a circuit comprising a non-linear element.

13. A system for azimuth determination of a given point with respect to another point comprising, in combination, means for producing at said second point a directive beam of wave energy adapted to rotate about a vertical axis so as to sweep the space around said point, means for receiving said beam at each passage thereof at said first point, means for locating in relation to time the beam signal thus received at said latter point, said last named means comprising means for deriving from said signal a control voltage, means under the control of said voltage for producing a short duration pulse defining a predetermined point of the amplitude-time curve of the received signal time-spaced by a constant interval from its maximum point and corresponding to a signal level having a predetermined ratio to the maximum level of said signal, means for producing at each passage of said beam through a known azimuth a reference signal, means for receiving said reference signal at said point and means for determining the azimuth of said given point by measuring the time spacing between said short duration pulse and said reference signal.

14. A system of azimuth determination of a given location with respect to another location, comprising in combination means for producing a beam of a pulsating radiant energy rotating about a vertical axis at said second location, means for receiving said beam at said first location, means for locating in relation to time the instant of each passage of said beam by said first location by a point of the envelope curve of successive pulses received at said first location during a passage of said beam by said location, said point of the envelope curve being outside of the point of maximum amplitude of said curve, said latter means comprising a limiter, means for controlling said limiter as a function of the maximum amplitude of said envelope curve of said pulses so as to produce a limitation of said signal curve at a level maintaining a predetermined ratio to said maximum amplitude and means for producing by differentiating the limited signal curve, a short duration pulse at the point of said signal curve corresponding to said level, means for transmitting a reference signal from said second location upon the passage of the beam by the predetermined direction, means for receiving said reference signal at said first location and means at said first location for measuring the time interval between reception of said reference signal and said short duration pulse.

15. A system for azimuth determination of a given point with respect to another point according to claim 14 which includes, at the receiving end, a limiter arrangement and at the transmitting end, a rotating radio beacon producing a beam of pulsating radiant energy, said beacon being adapted to operate while maintaining the following relations between various factors of the system:

$$T \min = \frac{\theta}{4\omega e}; \quad \Delta\alpha = \frac{\theta}{4\omega e}; \quad \alpha \neq \frac{\omega}{N}$$

where

T is the period of recurrence of the transmitter,
min is "minimum,"
$\theta$ is the angular width of the beam,
$\Delta\alpha$ is the accuracy of angle measurement,
$\omega$ is the angular speed of the beam and,
$e$ the precision of the limiter.

16. A method of locating at reception the position in relation to time of an incoming intelligence carrying signal pulse of a non-steep front form and variable level which consists in receiving said signal pulse, deriving from said signal pulse a control voltage, transforming said signal pulse under the control of said voltage into a substantially rectangular signal limited in duration in accordance with the time position of a point of the amplitude-time curve of said signal pulse corresponding to a signal level which varies as a function of the maximum amplitude of said pulse to maintain a predetermined constant ratio to said maximum amplitude, successively limiting and differentiating said signal so as to obtain sharply defined short duration pulses of opposite polarity in correspondence with the two edges of said signal, suppressing the first of said pulses of opposite polarity and utilizing the remaining sharp pulse.

17. A system of hyperbolic navigation comprising at the transmitting end at least a pair of transmitters operating in synchronism and transmitting pulses of a progressively variable or non-steep wave front form and at the receiving end means for receiving said pulses including means for locating in relation to time said pulses, said latter means comprising means for deriving from said received pulses a control voltage, means for limiting each received signal pulse, under the control of said voltage, at a point of its amplitude-time curve time-spaced from the point of its maximum amplitude and corresponding to a signal level which varies as a function of said maximum amplitude to maintain a predetermined ratio to said maximum amplitude, means for producing locally in correspondence with said point, by differentiating the so limited signal pulse, a steep front short duration pulse registering with respect to time the position of said received signal pulse, and means for utilizing said locally produced pulses for producing a desired indication of guidance or position of said craft.

References Cited in the file of this patent

UNITED STATES PATENTS

| | | |
|---|---|---|
| 1,135,604 | Meissner | Apr. 13, 1915 |
| 2,153,179 | Fitch | Apr. 4, 1939 |
| 2,391,411 | Goble | Dec. 25, 1945 |
| 2,433,838 | Elie et al. | Jan. 6, 1948 |
| 2,462,859 | Grieg | Mar. 1, 1949 |
| 2,468,109 | Richardson et al. | Apr. 26, 1949 |
| 2,509,208 | Busignies et al. | May 30, 1950 |
| 2,542,032 | Isbister et al. | Feb. 20, 1951 |
| 2,546,370 | Ostendorf et al. | Mar. 27, 1951 |
| 2,552,527 | Dean et al. | May 15, 1951 |
| 2,557,869 | Gloess | June 19, 1951 |
| 2,562,309 | Frederick et al. | July 31, 1951 |

FOREIGN PATENTS

| | | |
|---|---|---|
| 317,826 | Great Britain | May 29, 1930 |